Feb. 27, 1968   F. B. DE PODESTA ET AL   3,370,552
RAILWAY CARRIER FOR AUTOMOTIVE VEHICLES
Original Filed Feb. 27, 1961                           4 Sheets-Sheet 1
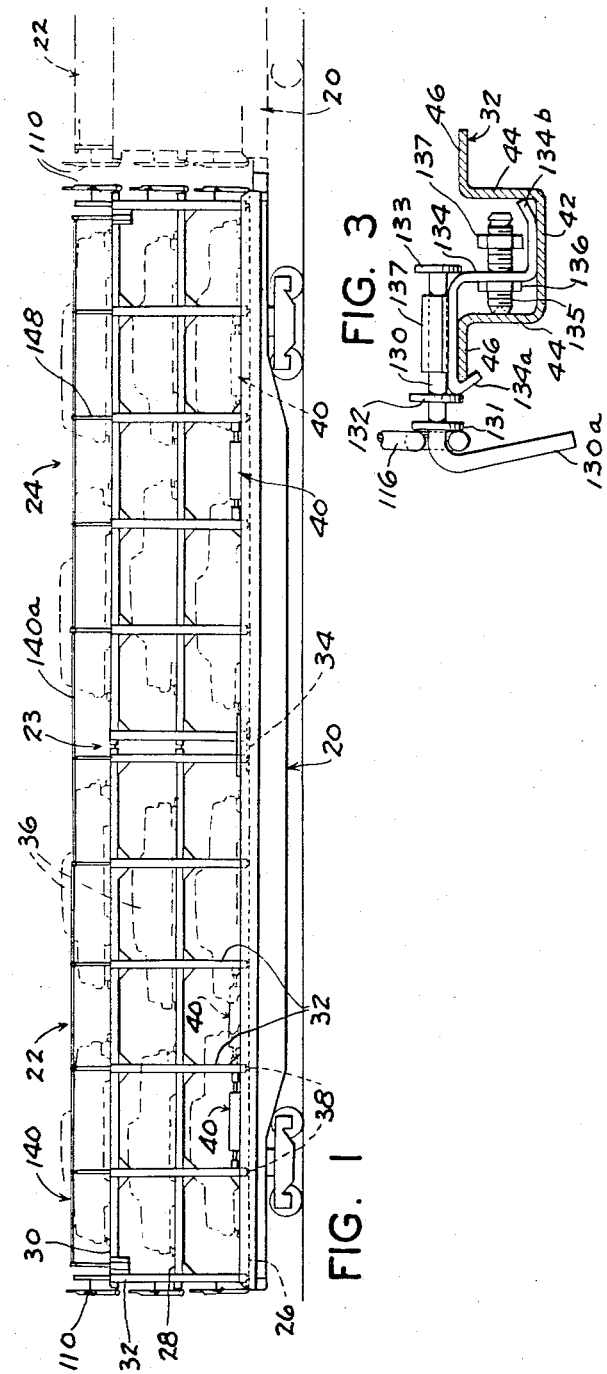
INVENTORS
FRANK B. DE PODESTA, GILBERT T. INNES
CHARLES M. BURT & DONALD E. KULLGREN
BY
Barnes, Kisselle, Raisch & Choate
ATTORNEYS

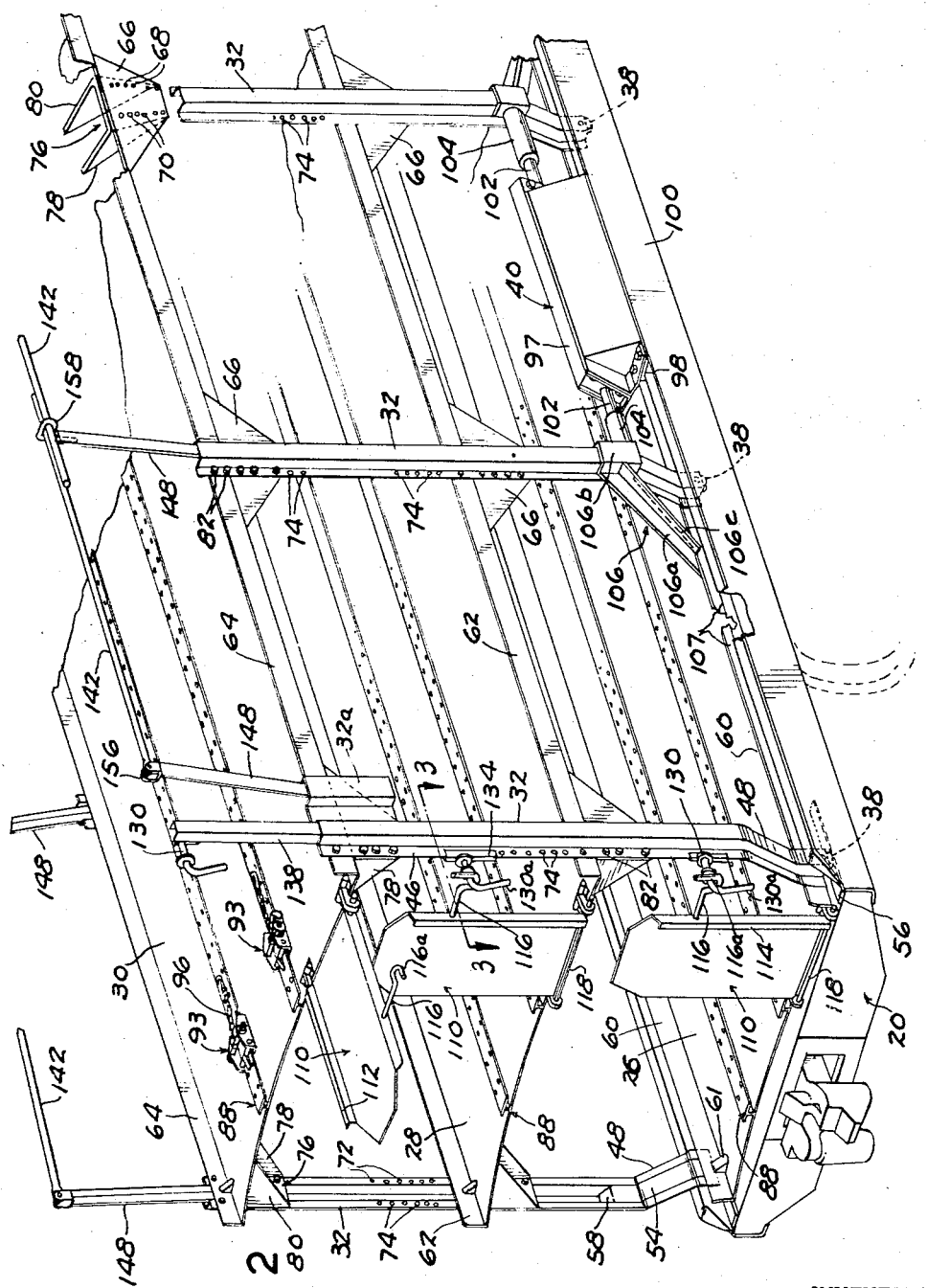

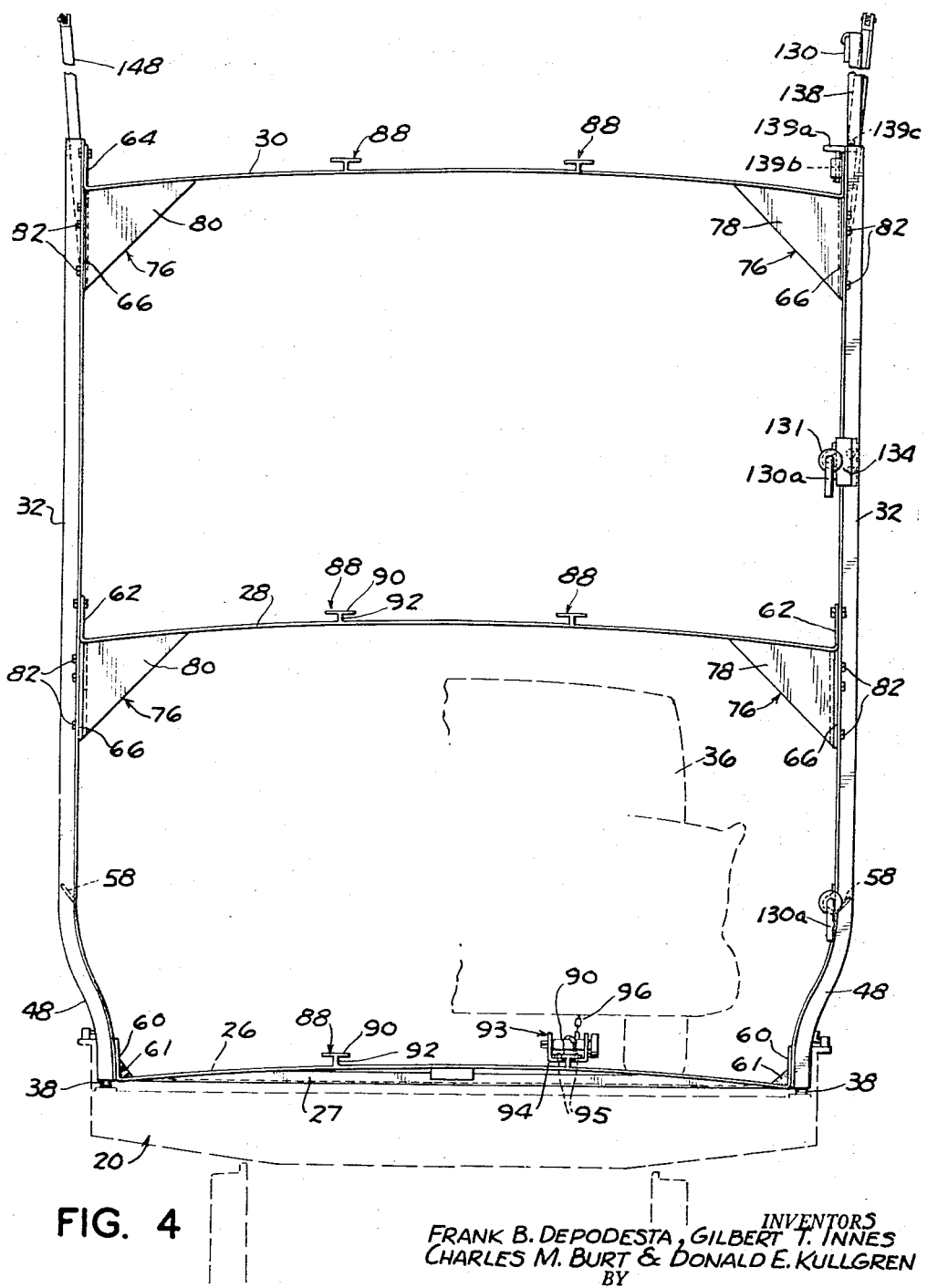

Feb. 27, 1968   F. B. DE PODESTA ET AL   3,370,552
RAILWAY CARRIER FOR AUTOMOTIVE VEHICLES
Original Filed Feb. 27, 1961   4 Sheets-Sheet 4

INVENTORS
FRANK B. DEPODESTA, GILBERT T. INNES
CHARLES M. BURT & DONALD E. KULLGREN
BY
Barris, Kisselle, Raisch & Choate
ATTORNEYS

United States Patent Office 3,370,552
Patented Feb. 27, 1968

3,370,552
RAILWAY CARRIER FOR AUTOMOTIVE
VEHICLES
Frank B. de Podesta, Farmington, Gilbert T. Innes, Dearborn, Charles M. Burt, Detroit, and Donald E. Kullgren, Livonia, Mich., assignors to Paragon Bridge & Steel Company, Novi, Mich., a corporation of Michigan
Original application Feb. 27, 1961, Ser. No. 91,879, now Patent No. 3,240,167, dated Mar. 15, 1966. Divided and this application Feb. 3, 1966, Ser. No. 547,098
6 Claims. (Cl. 105—368)

ABSTRACT OF THE DISCLOSURE

A hinged gangplank construction adapted to serve as a bridging plate between vehicle receiving decks of end coupled railroad cars. The gangplank is pivotally secured at its inboard edge to one end of a pair of spaced hinge links which in turn are pivoted at their other ends to the upper horizontal surface of the deck inwardly of an end edge thereof. By swinging the hinge links about their pivotal mounting on the deck, the pivot axis of the gangplank can be shifted from outboard to inboard of said deck end edge to thereby permit the outboard end of the gangplank to be correspondingly shifted to clear obstacles at the end of the deck of the next car. A hand lock is also provided for said gangplank comprising a handle bar fixed to the gangplank and a locking bar journalled on a support on the car for interlocking engagement with the handle bar in the raised upright position of the gangplank.

---

This application is a division of our co-pending application Ser. No. 91,879, filed Feb. 27, 1961, now Patent No. 3,240,167, Mar. 15, 1966, and entitled, "Railway Carrier for Automotive Vehicles."

This invention relates generally to transportation of vehicles by rail, and more particularly to a multi-level superstructure adapted to be mounted on a standard railway flat car to convert the same for efficient loading and transporting of both standard size and compact type automotive vehicles.

In order to complete more successfully with highway transportation of automotive vehicles the railroads have long sought a practical railroad car capable of economically accommodating more vehicles than are presently transportable on a highway haulaway trailer. The development of extra-length flat cars for piggy-back transport of semi-trailers has demonstrated that the railroads can complete favorably with the trucking industry when proper equipment is provided. However, even the extra-length, truck piggy-back flat car can only accommodate four standard size or five or six compact automobiles of contemporary American manufacture. Although several types of specially constructed multi-level automobile freight cars have been proposed as a solution to this problem, such prior art railway cars often are not economically feasible due to high construction, maintenance and/or operation costs, or because of other reasons inherent in the structure thereof.

Accordingly, it is an object of the present invention to provide a multi-level automobile carrier adapted for detachably mounting on a railway flat car and which can be rapidly loaded and unloaded with a competitive quantity of automobiles.

Yet another object is to provide a relatively low cost and lightweight multi-level superstructure which is capable of safely and securely supporting a plurality of automotive vehicles on a railway flat car even when subjected to the high impact stresses encountered in railroad coupling and humping operations.

A further object is to provide an improved bridge construction for quick interconnection between adjacent ends of railway automobile carriers adapted to be coupled in tandem relation for circus loading.

In the accompanying drawings:

FIG. 1 is an elevational side view of a railroad flat car having two tandem sections of a tri-level automobile carrier superstructure constructed and detachably shock mounted thereon in accordance with the present invention;

FIG. 2 is a fragmentary perspective view of one end of the automobile carrier superstructure with the top of one column thereof broken away to illustrate gusset details;

FIG. 3 is a top cross sectional view taken on the line 3—3 of FIG. 2 illustrating an adjustable column clamp for a gangplank latch;

FIG. 4 is an enlarged end elevational view of the tri-level superstructure mounted on the flat car;

Figure 5:
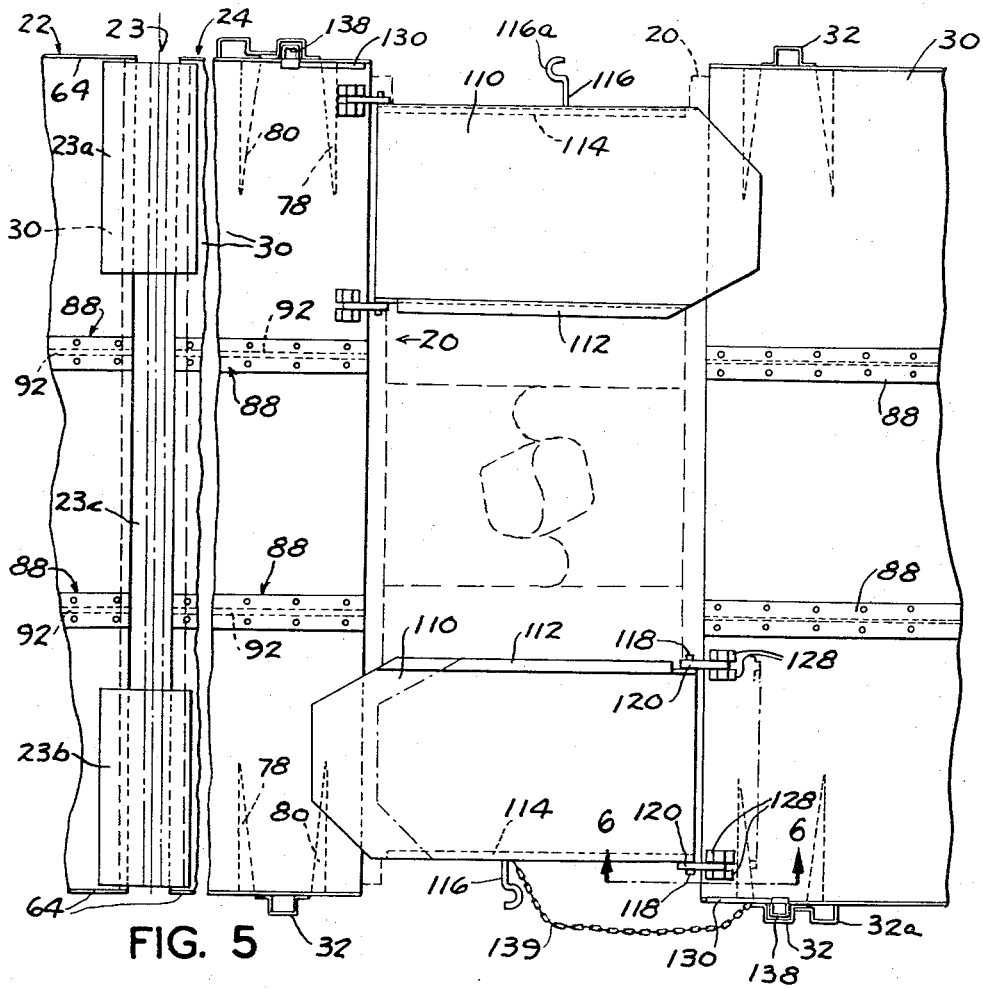
FIG. 5 is a fragmentary top plan view illustrating the gangplank structure for bridging between the same deck levels of two automobile loading superstructures mounted on separate flat cars.

Referring to FIG. 1, a conventional extra-length, truck piggy-back railroad flat car 20 is shown provided with two substantially identical sections 22 and 24 of a tri-level vehicle loading superstructure constructed in accordance with the present invention, sections 22 and 24 being shock mounted in tandem relation on the bed of the flat car to provide a convertible automobile loader railroad car. Each of the superstructure sections 22, 24 generally comprises a bottom deck 26, a middle deck 28 and top deck 30 which extend longitudinally of flat car 20 and are supported in vertically spaced relation by a series of longitudinally spaced vertical side columns 32. The adjacent ends of the two superstructure sections 22, 24 are connected at the bottom level thereof by a flexible linking plate 34, and suitable wheel track plates are provided (FIGURE 5) for slidably bridging the gap between the decks of the two sections so that automobiles 36, trucks or other motor vehicles may be driven from one section to another lengthwise of the railroad car. The superstructure rests on rollers 38 one of which is journalled in the bottom of each of the vertical columns 32 so that the entire tri-level superstructure is free to move endwise relative to flat car 20. Four shock absorbing structures 40 are connected between the superstructure and the flat car to absorb, limit and dampen such endwise movement. Each superstructure section 22, 24 is provided with two shock absorbing structures 40 arranged in staggered relation longitudinally thereof, one on each side of the flat car, so that one side of each of the vehicles parked on the bottom deck 26 is always accessible for entrance to and exit from the vehicle. Each section 22, 24 of the superstructure is removable as a unit from the flat car by means of a crane after the shock absorbing structures 40 are disconnected therefrom.

The details of the vertical columns 32 are best seen in FIGS. 2–5. In accordance with one feature of the invention, each column 32 is a one-piece beam which is preferably pressed from flat sheet stock into a cross sectional configuration known as a 'hat section" (FIG. 3) comprising a center section 42, a pair of parallel side sections 44 which extend perpendicular to center section 42 and a pair of coplanar rim or flange sections 46 disposed parallel to center section 42. Columns 32 have a bowed portion 48 at the bottom thereof formed in the shape of an S-curve (FIG. 4) to provide a wide beamed superstructure adapted to be mounted on the narrower beamed flat car 20.

In accordance with another feature of the invention, the bottom, middle and top decks 26, 28 and 30 are each made from a single piece of sheet metal, preferably 3/16 of an inch thick A7 or higher strength steel, and are formed by a rolling process so as to be arched upwardly in an arc of uniform radius to form a crowned deck (FIG. 4). After the rolling operation the outer longitudinal edges of deck plates 26, 28 and 30 are bent upwardly to form integral vertical flanges 60, 62 and 64 respectively, these flanges serving to longitudinally stiffen and strengthen the deck plates as well as providing outer curbing for each deck. Each of decks 26, 28 and 30 is independently supported by the vertical columns 32 at the proper elevation to provide sufficient vertical clearance between the decks to permit passenger vehicles to be driven lengthwise thereon from one end of the railroad car to the other end thereof. Bottom deck 26 is affixed in position spaced slightly above the bed of flat car 20 by welding side flanges 60 of the deck to column flanges 46. Flange 60 is bowed or bent outwardly to conform with the bow in the column flanges 46 at the point of attachment. A small right angle U-gusset 61 is welded in the gutters of bottom deck 26 adjacent each column 32 to stiffen side flanges 60 and hence columns 32 against lateral flexing at the bottom thereof. The middle and upper decks 28 and 30 are detachably secured to columns 32 by gusset structures which are permanently secured to these decks, and by bolting flanges 62, 64 to columns 32.

Referring to FIGS. 2, 4 and 5, the gusset structure of the invention includes a longitudinal gusset 66 comprising a trapezoidal plate mounted in an inverted position with the longer base edge thereof welded to the outer bottom edge of deck plates 28 and 30 so that plate 66 extends vertically downward therefrom. Two vertical rows of holes 68 and 70 are punched or drilled through plate 66 for alignment with similar rows of holes 72 and 74 provided in column flanges 46. The gusset structure also includes a U-section lateral gusset 76 which is pressed from a flat trapezoidal plate into a U-shape so that the triangular portions thereof provide a pair of inwardly extending lateral bracing arms 78 and 80. The triangular arm portions 78 and 80 are preferably bent from the center section of gusset 76 along bending lines which diverge upwardly from the apexes of the short base edge of the trapezoid so that the upper edges of arms 78 and 80 slope upwardly to conform to the arch of the deck plate, gusset 76 being welded along these edges to the undersurface of the deck plate. The lateral bracing arms 78 and 80 extend inwardly to a point approximately beneath the position of the wheels of the automotive vehicles carried on the decks. The center section of gusset 76 is provided with two vertical rows of holes which register with holes 68 and 70 in longitudinal gusset 66. A pair of gussets 66, 76 are secured to the decks adjacent each of vertical columns 32, and suitable anchor bolts 82 are inserted through the column holes 72, 74 and gusset holes 68, 70 so as to detachably connect the decks to the columns. Slightly modified gusset structures are employed for connecting the ends of decks 28, 30 to those vertical columns 32 located at each end of superstructure sections 22, 24, one of the triangular portions of gusset plate 66 being cut off to provide a surface which is flush with the outer vertical edge of such columns (FIG. 2).

The solid arched deck plates provide a strong bracing for the superstructure with a minimum loss of vertical clearance between the decks, thereby reducing the overall height of the superstructure. Since unused space is available below the arched bottom deck 26, a smooth, uncorrugated deck plate is used which is braced at longitudinally spaced intervals by angle irons 27 welded to the underside thereof along cutaway portions of the vertical flanges of the angle irons (FIG. 4), races 27 also serving to tie the bottom ends of laterally opposite columns 32 together. With respect to middle and top decks 28 and 30, the lateral U-shaped gussets 76 carry part of the vertical load and help maintain the arched condition of the decks when loaded with vehicles. Longitudinal gussets 66 also help carry the vertical load while longitudinally bracing the superstructure and reinforcing the side flanges 62 and 64 of the decks against bending stresses. Additional bracing may be provided for heavy weight vehicles, such as X-bracings in the form of two intersecting angle irons welded between columns 32 at the shock absorber bays, as well as U-section arched cross beams 86a welded to the undersurfaces of decks 28 and 30 so as to extend between laterally opposite columns. By locating the upper edges of the U-section beam between ribs 86, there is a minimum loss of vertical clearance between the decks.

The tri-level superstructure sections 22, 24 are convertible to a bi-level superstructure by unbolting upper deck 30 and removing the same from between the columns, and then unbolting middle deck 28 and shifting it upwardly so that the gusset bolt holes 68, 70 register with the uppermost column holes 72, 74 in the middle series thereof in columns 32. Middle deck 28 then becomes the top deck and is sufficiently spaced from bottom deck 26 to accommodate automotive vehicles such as panel trucks and trailer tractors having greater overall height than that of passenger vehicles.

The one piece decks 26, 28 and 30 are further stiffened and strengthened against longitudinal bowing by T-section beams 88 which are mounted in pairs lengthwise on the upper surface of each deck with one beam adjacent the inner edge of each wheel track (FIGS. 2, 4 and 5). Beams 88 are preferably fabricated by cutting a wide flanged H-section beam longitudinally in half to form two T-beams each comprising a horizontal plate 90 and a vertical web piece 92 which are integrally joined together. The beams are affixed to the decks by welding the bottom edge of web 92 to the flat portions of the upper surface of the deck plate. The horizontal cross plate 90 of T-beams 88 slidably receives a plurality of holddown windlass mechanisms 93 having flange portions 94 which underlie the undersides of horizontal web 90 (FIG. 4), flange portions 94 carrying vertical studs 95 which extend upwardly therefrom into perforations provided in horizontal cross web 90 of the beam (FIG. 5). Each holddown mechanism 93 includes a chain 96 adapted for connection to the underframes of automotive vehicles 36 in a known manner, four holddown mechanisms being used to anchor each vehicle. Thus T-beams 88 serve as reinforcements for the deck plates and as anchoring elements for the holddown mechanisms 93.

Referring to FIG. 5, the gap indicated at 23 between the decks of superstructure sections 22 and 24 is covered by bridging plates 23a and 23b which are welded to the upper surface of deck 30 of section 22. The outer ends of plates 23a and 23b abut against the inner sides of deck side flanges 64 of superstructure section 24, thereby preventing lateral shifting of sections 22, 24 relative to one another. A cover plate 23c laterally spans the entire gap between the sides of the deck, one side of the upper surface of plate 23c being welded to the undersides of decks 28 and 30 of section 22 so that the other side plate 23c overlaps the underside of decks 28 and 30 of section 24 to provide protection against drippage and to keep holddown chains from dangling in the gap. However, plates 23a, 23b, 23c are free to slide longitudinally on decks 28, 30 of section 24 so that sections 22, 24 can flex longitudinally relative to one another about the axis of the flexible connection therebetween provided by coupling 34 at the bottom of the sections.

In order to facilitate circus loading of the above multi-level superstructure, each of decks 26, 28 and 30 are provided with a hinged gangplank 110 at diagonally opposite corners of the decks (FIGS. 1, 2 and 5). This staggered arrangement of gangplanks 110 permits symmetrical coupling of flat car 20 with similar equipped cars without regard to the relative direction of the cars. Each gangplank 110 is of sufficient length to bridge the distance between the adjacent coupled ends of the respective railroad cars 20, and is pivotably mounted at one end by an improved hinging structure for double jointed movement.

As shown in FIG. 5, each gangplank 110 comprises a sheet metal plate having integral L-shaped flanges 112 and 114 extending respectively along the inner and outer side edges thereof which serve to reinforce the gangplank against bending stresses. In the horizontal, lowered position of gangplanks 110, flange 112 extends above the upper surface of the gangplank to provide an inner curbing to prevent vehicles from running off the side edges of the gangplank, while the outer flanges 114 extend downwardly from the plane of the gangplank and serve as a support for a combination handle and latch bar 116 extending outwardly therefrom parallel to the plane of gangplank 110.

Figure 6:
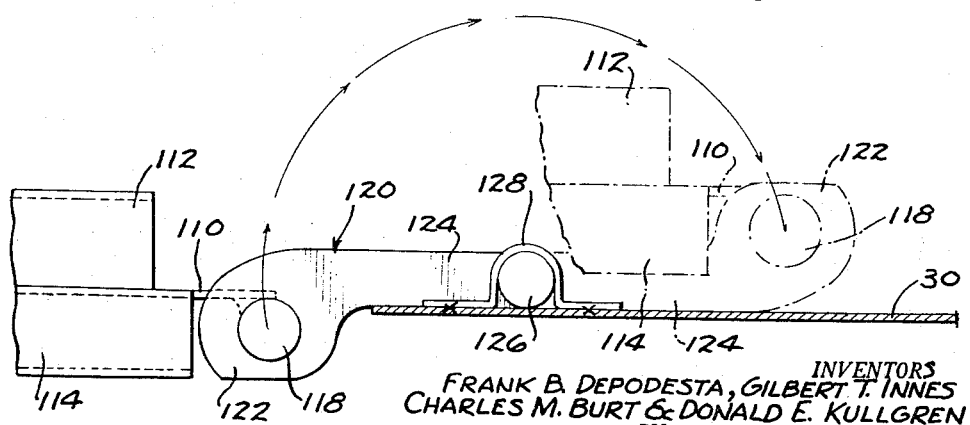
FIG. 6 is a side cross sectional view taken on the line 6—6 of FIG. 5 but enlarged therefrom to illustrate the hinge structure of the gangplanks.

A rod 118 is welded to the bottom edge of gangplank 110 which extends beyond the opposite side edges thereof to provide pivot pins for rotatably receiving a hinge link 120 on each end of the rod. Hinge link 120 is a one piece casting which includes respectively an eye portion 122 (FIG. 6) provided with a bore adapted to rotatably receive rod 118, an arm 124 extending tangentially from the periphery of eye portion 122 and a cross arm 126 at the end of arm 124 extending parallel with the axis of the bore in eye portion 122. Cross arm 126 of hinge link 120 is journalled on deck plates 26, 28, 30 by a pair of inverted U-straps 128 which are spot welded to the upper surfaces of the decks. Straps 128 are positioned inwardly of the lateral end edge of the decks so that eye portion 122 of link 120 is disposed outwardly beyond such edge when link 120 is in the horizontal position indicated in solid lines in FIGS. 5 and 6. In this position, the supporting surface of gangplank 110 is flush with the deck for bridging between the adjacent ends of decks located at the same level in the respective superstructures of the end coupled railroad cars.

After the superstructures are loaded with vehicles, gangplanks 110 are raised from the lowered position by being pivoted upwardly about the axis of shaft 118 to a raised vertical position as illustrated in FIG. 2 with respect to the gangplanks provided for the bottom and middle decks 26 and 28. In this vertical position gangplanks 110 serve as tailgates for each deck, the gangplanks being held in position by locking handle 116 with a latch bar 130 horizontally journalled on end columns 32. Latch bar 130 is provided with a pair of axially spaced apart washers 131 and 132 welded on the horizontal portion thereof, and the outer end 130a of bar 130 is bent back at an acute angle to the horizontal portion thereof so as to terminate in the plane of outer washer 131 (FIG. 3).

To lock the gangplank in the upright position thereof, latch bar 130 is rotated until arm 130a extends vertically upward, and then gangplank 110 is pivoted to a vertical position in which a hook shaped portion 116a of gangplank handle 116 abuts against washer 131 and the underside of bar 130. Latch bar arm 130a is then rotated clockwise downwardly, the resilience of arm 130a and of the upright portion of handle 116 allowing the angled arm 130a to be cammed thereover and then serving to bias arm 130a in a downwardly extending unstrained position wherein handle 116 is locked between washer 131 and arm 130a.

The latch bar 130 provided for gangplank 110 of bottom deck 26 is journalled at a fixed elevation on column 32 by a pair of U-straps welded to the inner sides of the respective flanges 46 of the column (FIG. 4). Another washer 133 is welded to latch bar 130 intermediate the column side sections 44 which, together with washer 132, limits axial movement of the latch bar.

In order to permit vertical adjustment of the latch bar 130 provided for gangplank 110 of middle deck 28, a clamp structure is provided (FIG. 3) which comprises a plate 134 bent along vertical bending lines into an S-shape to conform to column 32. One vertical edge of plate 134 has a reversely bent lip portion 134a which grips the vertical edge of the column flange 46 facing the gangplank, while the other vertical edge 134b of plate 134 is bent at an acute angle to the opposite side section 44 of the column so as to dig into the surface thereof. A pair of vertically spaced horizontal screws 135 having conically recessed forward ends are threadably received in nuts 136 which are welded to the central lateral portion of plate 134 in co-axial alignment with suitable screw holes therein. A lock nut 137 is threadably received on each screw 135 which is screwed against plate 134 to lock screw 135 against rotation. When screws 135 are threaded towards the gangplank side of column 32, the angled edge 134b of the plate is forced into one column side 44 while the forward ends of the screws bite into the other column side 44, thereby securely clamping plate 134 to the column. The longitudinal portion of plate 134 adjacent column flange 46 has a U-strap 137 welded thereto in which latch bar 130 is journalled for rotation about a horizontal axis.

The latch bar 130 provided for the gangplank 110 of top deck 30 is similarly journalled on the upper end of a U-section channel post 138 (FIG. 2) which is telescopically mounted within the top of column 32 at the gangplank corner of the superstructure. A latch structure (FIG. 4) comprising a T-bar 139a journalled for vertical axial movement in a U-strap 139b is provided for engaging between a lug 139c in post 138 and the upper edge of deck side flange 64 to hold post 138 in the raised position thereof. To release this latch, post 138 is raised and T-bar 139a rotated 90° so that it is free of lug 139c.

Each gangplank 110 has a suitable length of flexible chain 139 (FIG. 5) connected at the respective ends thereof to gangplank flange 114 and to column 32 (or to clamp plate 134 or post 138 in the case of the gangplanks for the middle and top decks). Chains 139 are used in raising and lowering the gangplanks and also serve as safety chains to prevent the gangplanks from pivoting downward more than a few degrees below the horizontal bridging position thereof. Sufficient slack exists in the chain in the horizontal position of the gangplank to insure adequate lateral clearance for passage of vehicles past the chains.

The double jointed hinging of gangplanks 110 is utilized to advantage when the bumper of an automotive vehicle is in a position close to or overhanging the edge of the deck. A bumper so located interferes with the swinging movement of gangplanks 110 when pivoted about the axis of shaft 118 with link 120 in the extended position of FIG. 2. When this situation occurs it is a simple matter to swing the bottom edge of the gangplank inboard of deck 30 so that link 120 lies flush against deck 30 in the dotted position illustrated in FIGS. 8 and 9. When so retracted, the gangplank clears the bumper or other obstruction as it is pivotably raised or lowered, and when once past the obstruction it may be shifted outboard of the deck by pivoting link 120 to the outwardly extending horizontal position thereof.

We claim:

1. In a railroad car having a horizontally disposed vehicle receiving deck extending longitudinally of said railroad car, the combination comprising a gangplank adapted to span the distance between the ends of two of said decks when two of said railroad cars are end coupled together, said gangplank having shaft means non-rotatably secured to the undersurface thereof adjacent a lateral edge thereof, a plurality of hinge links each having a generally circular eye portion journalled on said shaft means at axially spaced apart positions relative to one another, said links each also having an arm portion extending tangentially from the periphery of said eye portion and perpendicular to the axis of said shaft means with a cross arm portion at the end of said arm portion opposite said eye portion and extending beyond the sides of said arm portion parallel to the axis of said shaft means, and a pair of journal straps for each of said links, each pair of said straps being secured to the upper surface of said deck laterally spaced from one another with said cross arm of said link being journalled thereunder against said deck so that said arm of said link extends longitudinally between said pair of journal straps, each pair of said journal straps being positioned inwardly of the lateral end edge of the deck so that said link is pivotable in a longitudinal plane about the axis of said cross arm thereof to an outwardly extending position wherein said arm portion lies against said deck and said eye portion is dependent therefrom beyond said deck edge to support said gangplank flush with said deck in the horizontal position thereof, said link being pivotable to an inwardly retracted position thereof relative to said deck edge wherein said arm portion lies against said deck, said gangplank thereby being pivotable about the axis of said shaft means from either an outboard or inboard position thereof so that the arc traversed by the outboard end of the gangplank is adjustable to clear the end of the deck on the other of said railroad cars.

2. In a railroad car having a horizontally disposed vehicle receiving deck and support means positioned adjacent one edge of said deck, the combination comprising a gangplank hinged to said edge of said deck adjacent said support means for pivotable movement outboard thereof about a generally horizontal axis, said gangplank having a handle bar supported thereon with a portion of said handle bar extending therefrom at a predetermined distance from the gangplank pivoting axis, a locking bar journalled on said support means for rotation about an axis transverse to and spaced said predetermined distance from the gangplank pivoting axis, said locking bar having from the gangplank pivoting axis, said locking bar having a portion extending from said support means transverse to said handle bar in a position to receive said handle bar tangentially against the periphery thereof when said gangplank is pivoted inboard to a raised position adjacent said support means, stop means on said extending portion of said locking bar for limiting movement of said handle bar axially therealong, said locking bar having an arm portion joined to said extending portion thereof at a point spaced outboard from said stop means and extending from said extending portion at an acute angle relative thereto so that said arm portion is engageable with said handle bar at a point spaced from the axis of rotation of said locking bar and inwardly from the outer end of said arm portion so that the arm portion is rotatable from a disengaged position relative to said handle bar into an angled engaging position with one side thereof, said locking and handle bars being resiliently deformable to permit the angled arm portion of said locking bar to mesh with and be rotated past said handle bar until the angled arm portion of the locking bar is on the other side of said handle bar to thereby lock the same between said arm portion and said stop means of said locking bar.

3. The combination recited in claim 2 wherein said handle bar includes a U-shaped hook portion disposed in a plane perpendicular to the rotational axis of said locking bar in the raised position of said gangplank, said extending portion of said locking bar of said gangplank being received in the open upper end of said U-shaped hook portion as said gangplank is pivoted inboard to said raised position thereof, said hook portion of said handle bar thereby locking said gangplank against movement in said plane of said hook portion and said angled arm portion of said locking bar locking said gangplank against pivotal movement about said axis thereof.

4. The combination recited in claim 2 wherein said support means includes a vertical column with a channel section therein comprising a vertical center web and a pair of spaced, parallel sides extending respectively from the opposite vertical edges of said center web in planes perpendicular thereto, said support means also including a plate received in said channel section and having a vertical center portion disposed adjacent one of said sides of said column channel section, said plate having a vertical flange portion disposed adjacent said center web of said column channel section and another vertical flange portion disposed outside said column channel section for rotatably supporting said locking bar thereon, and screw means threadably received in said plate center portion perpendicular thereto so as to be threadable into abutting engagement with said one side of said column channel section to thereby urge the outer vertical edge of said one flange portion of said plate into frictional engagement with said other side of said column channel section to thereby detachably fasten said plate on said column.

5. In a superstructure adapted to be carried on a railroad flat car and having a horizontally disposed vehicle receiving deck extending longitudinally of the railroad car and laterally between a pair of vertical columns positioned adjacent one end of said car, the combination comprising a gangplank hinged to one end of said deck adjacent one of said columns for pivotable movement in a vertical longitudinal plane, said gangplank having a handle bar supported thereon so as to extend laterally from the outer longitudinal side thereof, said one column having a locking bar journalled thereon for rotation about a horizontal longitudinal axis, said locking bar having a portion extending beyond said column in a position to receive said handle bar tangentially against the periphery thereof in a raised position of said gangplank, said locking bar having stop means secured to said extending portion thereof for limiting movement of said handle bar axially inward therealong, said locking bar having an arm portion joined to said extending portion thereof and being reversely bent at an acute angle relative thereto outwardly of said stop means whereby said reversely bent arm portion of said locking bar is rotatable from a disengaged position relative to said handle bar into an engaging position therewith wherein the outer end of said locking bar arm portion extends beyond said handle bar to serve as a lever arm for rotating said arm portion into mesh with and resiliently past said handle bar until said handle bar is locked between said reversely bent arm portion and said stop means of said locking bar.

6. In a railroad car having a horizontally disposed vehicle receiving deck, the combination comprising a gangplank adapted to span the distance between one edge of said deck and the adjacent edge of another of said decks on another of said railroad cars positioned adjacent said railroad car for transferring vehicles therebetween, hinge means having one portion thereof pivotably connected to said gangplank near one end thereof and having another portion thereof spaced from said one portion pivotably connected to said deck adjacent said one edge thereof whereby the pivotal connection of said gangplank with said hinge means is movable in an arc about the pivotal connection of said hinge means with said deck between positions respectively outwardly beyond and inwardly of said one deck edge so that the other end of said gangplank is respectively movable between corresponding positions wherein said other end of said gangplank clears and overlaps said adjacent edge of said other deck on said other railroad car, said hinge means comprising a rigid link pivoted at one end thereof to said one end of said gangplank and pivoted at the other end thereof to the upper surface of said deck at a point spaced inwardly of said one edge thereof, said link being pivotable between extended and retracted positions relative to said one deck edge in each of which positions said link lies adjacent the upper surface of said deck whereby said one end of said gangplank is pivotably supported by said one end of said link inwardly or outwardly of said one deck edge, said link including an arm portion extending intermediate said ends thereof and a cross arm portion joined to said other end thereof extending parallel to the axis of the pivotal connection of said gangplank with said link, and a pair of spaced apart journal straps secured to said upper surface of said deck at said point spaced inwardly of said one edge thereof, said cross arm portion being journalled between said straps and said upper surface of said deck with said arm portion extending therefrom for pivotal movement in the space between said straps whereby said arm portion of said link lies flat against said upper surface of said deck in both said extended and retracted positions thereof for securely supporting said gangplank in either of said positions.

References Cited

UNITED STATES PATENTS

| | | | |
|---|---|---|---|
| 1,174,864 | 3/1916 | Hillier | 105—436 |
| 1,676,073 | 7/1928 | Brown | 16—163 |
| 2,494,682 | 1/1950 | Aspin | 16—163 |
| 2,872,698 | 2/1959 | Gommels | 16—163 |
| 3,063,389 | 11/1962 | De Grandpre | 105—368 |
| 3,203,364 | 8/1965 | Gutridge | 105—458 |

ARTHUR L. LA POINT, *Primary Examiner.*

DRAYTON E. HOFFMAN, *Examiner.*